United States Patent [19]

Trickle et al.

[11] Patent Number: 4,843,373
[45] Date of Patent: Jun. 27, 1989

[54] LOADING DOCK SIGNAL AND CONTROL SYSTEM

[75] Inventors: Glen Trickle, Racine; Michael A. Swessel, Cudahy, both of Wis.

[73] Assignee: Rite-Hite Corporation, Milwaukee, Wis.

[21] Appl. No.: 131,196

[22] Filed: Dec. 10, 1987

[51] Int. Cl.$^4$ ............................................. G08B 21/00
[52] U.S. Cl. .................................. 340/540; 340/686; 340/687; 414/401
[58] Field of Search ............... 340/540, 687, 686, 533; 414/401

[56] References Cited

U.S. PATENT DOCUMENTS 3,744,043 7/1973 Walden et al. ...................... 340/533
3,990,075 11/1976 Schmitz et al. ...................... 340/533
4,692,755 9/1987 Hahn .................................. 414/401

Primary Examiner—Glen R. Swann, III
Attorney, Agent, or Firm—Neuman, Williams, Anderson & Olson

[57] ABSTRACT

A system for use in a loading dock facility includes a control unit which checks the condition of input terminals connected to control switch, locking device, overhead door and/or leveler condition sensors and which develops signals on output terminals connected to signal lights, a vehicle locking device, an overhead door mechanism and/or a leveler device. The control unit is programmable to be versatile and to obtain various safe and reliable modes of operation and is also operable to perform various diagnostic operations.

26 Claims, 13 Drawing Sheets

LOADING DOCK SIGNAL AND CONTROL SYSTEM

BACKGROUND OF THE INVENTION

1. Field of the Invention:

This invention relates to a loading dock signal and control system and more particularly to a system which achieves a very high degree of safety and security in the parking of vehicles at a dock and in the loading and unloading of the vehicles. The system of the invention is readily installed and is easily adaptable for use with various types of associated apparatus including levelers, door openers, security systems, monitoring systems and control systems. It is also highly reliable but is also easy to trouble-shoot should any problems occur and it is readily and economically manufacturable.

2. Background of the Prior Art:

The Hahn U.S. Pat. No. 4,692,755, issued Sept. 8, 1987 discloses a loading dock signal and control system which has important advantages over prior system, particularly with respect to increased safety and reliability. The Hahn system is operative with a locking device which is mounted on a loading dock and which includes a hook moved upwardly to lockingly engage a safety bar of a vehicle and restrain the vehicle against movement relative to the dock while being loaded or unloaded. The system includes outside red and green lights for indicating to a truck driver when it is not safe and safe to back in or pull out and inside red and green lights for indicating to dock attendants when it is not safe and safe to load or unload a docket truck or trailer. An important safety feature of the system is in the provision of a slippage control mode of operation in which the hook, after being moved to its upper lock position, is automatically moved upwardly thereto whenever it has slipped to a position below the lock position. The system is also advantageous in detecting malfunctions and generating alarm signals in response thereto.

SUMMARY OF THE INVENTION

This invention was evolved with the general object of providing a loading dock signal and control system which retains the advantageous features of the system of the Hahn patent but with enhancements to achieve greater security and safety in operation and to obtain optimum results when used with levelers and other associated apparatus, while being high reliable, readily serviceable and economically manufacturable.

In accordance with this invention, a system is provided which is arranged for operation with a locking device in the manner as disclosed in the Hahn patent and which preferably includes a slippage response or "anti-theft" operation as disclosed in the Hahn patent. The system of this invention is also similar to the systems of the Hahn patent in that an inside control unit is provided which includes red and green lights, lock and unlock actuator keys and a key pad for entry of a security code. Outside red and green lights are also provided are incandescent lights rather than the strobe lights referred to in the Hahn patent. However, the system of the invention is usable with strobe lights, if desired.

Important features of the invention relate to the provision of a programmable control unit which is selectively controllable to obtain a number of different possible modes of operation. It includes input terminals connectable to switches of the locking device and to lock and unlock actuator keys and security code keys, as in the Hahn system, and it includes additional terminals for connection to associated apparatus such as levelers and door openers and for connection to monitoring, control and security systems. A programmed operation is provided such that the system is highly versatile with a variety of different modes of operation, dependent upon the type of leveler or other associated equipment with which the system is used and dependent also upon the signals desired for maximum safety and security as well as ease of use. The unit is so constructed as to be readily adaptable for connection to many different types of equipment and can be easily programmed to obtain many different types of operations and features, to meet the needs and desires of users and to improve reliability, safety and security.

Further important features of the invention relate to diagnostics, different types of diagnostics being provided. One type of diagnostics involves the automatic development of an alarm if internal circuits of the control unit should fail to function properly. Another type of diagnostics provides procedures for thorough checking of the operation of components connected to the unit and checking of various functional operations in a manner such as to insure that all parts of the systems are operating satisfactorily and to minimize safety hazards. The diagnostics are especially advantageous in facilitating initial set up of the system and are also advantageous in quickly and accurately locating the source of any problems which might occur. The system includes all equipment required for performing the diagnostics and no auxiliary apparatus is required. Lights are provided on the control unit to indicate the status of operation of key components of the system and to facilitate diagnostics and a special light is provided to indicate the proper operation of internal circuits of the control unit, a flashing light being preferably provided for this purpose.

These and other objects, features and advantages will become more fully apparent from the following detailed description and the accompanying drawings.

DESCRIPTION OF A PREFERRED EMBODIMENT

Figure 1:
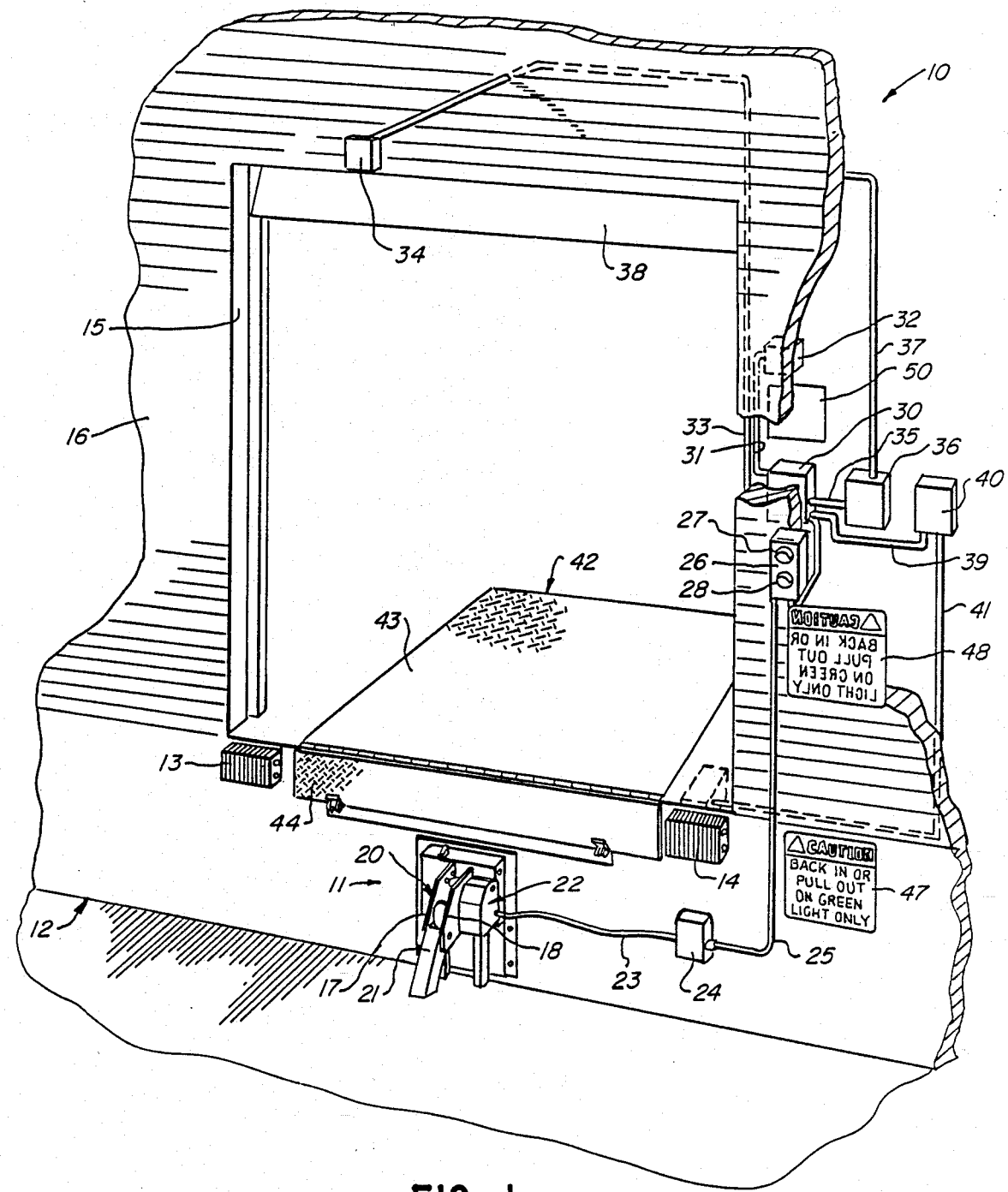
FIG. 1 is a perspective view showing a loading dock facility which includes a system constructed in accordance with the invention.

Reference numeral 10 generally designates a docking facility which includes a control and signalling system constructed in accordance with the principles of this invention. The illustrated facility 10 includes a restraining device 11 which is mounted on a hook 12 at a central position between a pair of bumpers 13 and 14 and in front of a loading bay opening 15 in a wall 16. The device 11 is arranged to lockingly engage a standard type of bumper which includes a transverse horizontal bar at a certain level at the rear of a truck or trailer. The bumper is required by I.C.C. regulations and the bar is commonly referred to as an "ICC bar". When a truck or trailer is backed in toward the device 11 and bumpers 13 and 14, the ICC bar engages cam surfaces 17 and 18 of a spring-loaded vertically movable housing 20 to move the housing 20 downwardly, the bar being then positioned over a hook 21 which is pivotally supported by the housing 20. The hook 21 is then rotated upwardly by an actuator unit 22 to lockingly engage the ICC bumper and restrain the truck or trailer against movement during loading and unloading. It will be understood that the device is usable with either trucks or trailers and references herein to either should be understood to apply to the other as well.

The device 11 may, for example, be constructed in the manner as disclosed in the Hipp U. S. Pat. No. 4,264,259 and the actuator unit 22 may include an electric motor and limit switches which are operated in accordance with the angular position of the hook 21 as disclosed in the aforementioned Hahn patent, the disclosures of said patents being incorporated herein by reference. The motor and the limit switches of the unit are connected through a flexible wire harness 23 to a junction box 24 and through wires in a conduit 25 to a box 26 which is mounted on the outside of wall 16 and which includes red and green outside lights, indicated by reference numerals 27 and 28. The terminals of lights 27 and 28 and the wires from the actuator unit 22 are connected through wires in a conduit to an inside control box 30 which is connected through wires in a conduit 31 to a junction box 32, for supply of operating current to the system.

The control box 30 may also be connected through a wires in a conduit 33 to a photoelectric sensor device 34 on the outside of the wall 16, device 34 being operative to sense whether or not a trailer is positioned against the dock, as through sensing whether light is reflected from the upper surface of a trailer. Control box 30 is also shown connected through wires in a conduit 35 to an overhead door control box 36 connected through conduit 37 to the operating mechanism (not shown) for an overhead door 8 and through wires in a conduit 39 to a leveler control box 40 connected through a conduit 41 to a leveler which is generally designated by reference numeral 42.

Leveler 42 as illustrated is of a type known in the art and it includes a platform 43 which has a rearward end hinged to the dock 12 and which has a lip 44 hinged to its forward end. Platform 43 is raised and the lip 44 is extended when a dock attendant pushes a control button of the control box 40 or, if the apparatus is of a mechanical type, when he activates a chain release assembly. Then the platform 44 automatically settles or is walked down to a position in which the lip 44 is horizontal and in engagement with the floor of the trailer. The system of the invention is usable with various types of levelers including either automatic or mechanical levelers of the type illustrated, dock edge mounted levelers and levelers which are automatically operated when a trailer is backed in.

On the outside of the wall 16, at least two signs 47 and 48 are preferably provided, sign 47 containing the following legend:

△ CAUTION

BACK IN OR

PULL OUT

ON GREEN

LIGHT ONLY

Sign 48 contains a mirror image of the same legend, for viewing through the rear view mirror of a truck.

A sign 50 is disposed on the inside of the wall above the control box 30, with the legend:

△ CAUTION

ENTER ON

GREEN ONLY

Figure 2:
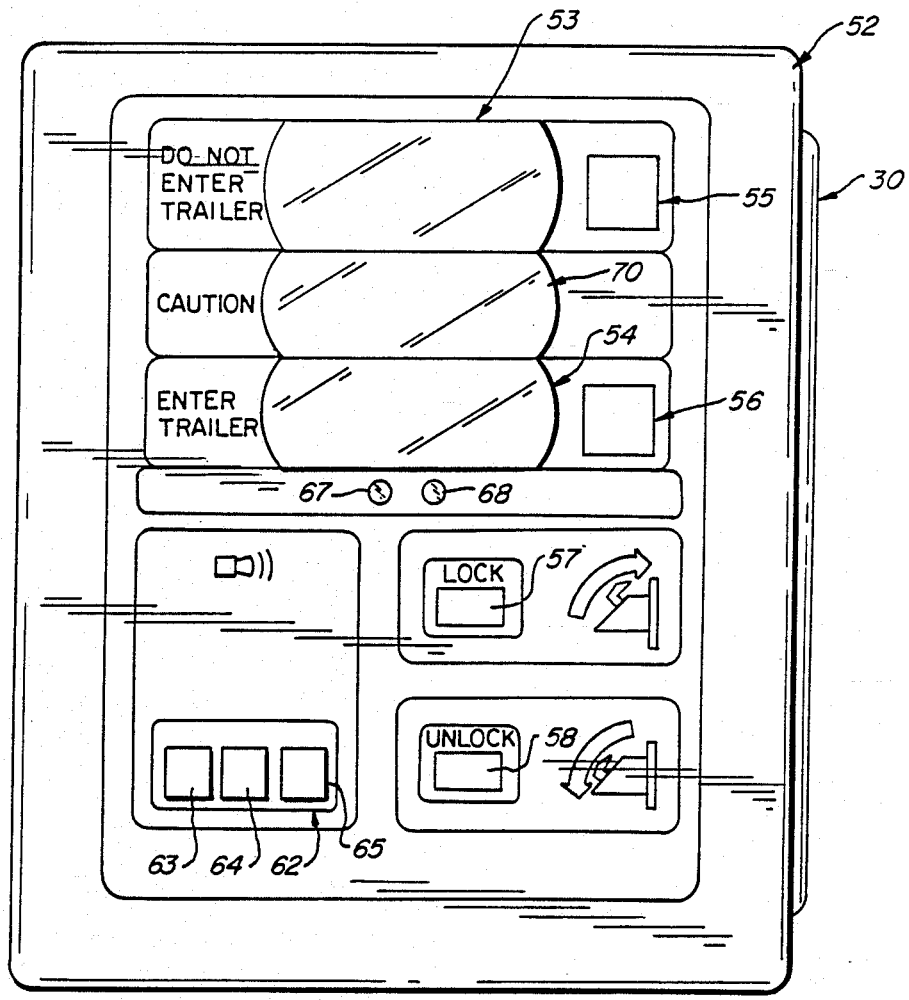
FIG. 2 shows a front panel of an inside control box of the system.

FIG. 2 shows a front panel 52 of the control box 30 which is preferably located within arm,s reach at eye level near the door opening 15, to be readily accessible and visible to dock attendants. It includes red and green lights 53 and 54 with indicia to the left thereof "DO NOT ENTER TRAILER" and "ENTER TRAILER". To the right of lights 53 and 54, illustrations 55 and 56 are provided, each of which shows a lift truck in a square or box, the illustration 55 including a diagonal line to show that it is unsafe to operate a lift truck when the red light unit 53 is on.

Front panel 52 also includes switch actuators 57 and 58 which are labelled "LOCK" and "UNLOCK" with illustrations 59 and 60 to the right thereof to indicate that upon operation of actuator 57, the hook will be moved upwardly and that upon operation of the actuator 58, the hook will be moved downwardly.

In addition, the front panel 52 includes a key pad 62 having the label "HORN SILENCE CODE" and including three switch actuators 63, 64 and 65 which are respectively labelled "1", "2" and "3". Above the key pad 62 there is an illustration 66 of a horn, with underlined instructions, as follows:

IF HORN SOUNDS OR RED LIGHT IS ON
DOK-LOK IS NOT PROPERLY ENGAGED
CHECK OPERATION OF DOK-LOK
TRAILER MAY NOT BE AGAINST DOCK
ICC BAR MAY NOT BE SERVICEABLE
SECURE TRAILER BY OTHER MEANS

The illustrated front panel 52 additionally includes a pair of lights 67 and 68 such as light-emitting diodes on LEDs for indicating the status of the outside lights 27 and 28 to an attendant on the inside. It also includes an amber light unit 70 which may be turned on after a horn is sounded in response to a malfunction or fault condition and after the horn is then silenced by an attendant. The provision of light 70 is an optional feature and operations with and without the light 70 are discussed hereinafter.

In a typical operation, the outside green light 28 will be on when no trailer is docked, indicating to the truck driver that it is safe to back in. On the inside, the red light unit 53 will be on and the green light unit 54 will be off.

A trailer is backed in to engage the bumpers 13 and 14 and to engage the ICC bar with the cam surfaces 17 and 18 of the spring-loaded housing 20 to move the housing 20 downwardly, the ICC bar being then positioned over the hook 21. A lock operation may then be initiated to engage the hook 21 with the ICC bar and restrain the trailer against movement relative to the dock.

To initiate the locking operation, the lock actuator 57 of the inside control box 30 may be pressed by a dock attendant. The outside red light 27 will be turned on and the outside green light 28 will be turned off. After the hook reaches the lock position, the inside green light 54 will be turned on and unloading and/or loading of the trailer may proceed. If an optional door interlock feature is used, it will not be possible to raise the door until the hook successfully reaches the lock position. Also, with the optional door interlock feature, it will not be possible, after loading or unloading, to lower the hook until the door is down.

When a leveler 42 is used in combination with an overhead door, an interlock is provided to prevent operation of the leveler until the door is raised, to prevent the door from being damaged by operation of the leveler. If an optional leveler interconnect feature is used, the lock operation may be initiated automatically in response to operation of the leveler. However, if desired, the lock operation may be independently initiated, without operating the leveler, by operating the actuator 57 of the inside control box 30.

As another option, the lock function may be initiated automatically, using the photosensor or other means to sense the positioning of a truck or trailer at the dock.

After a trailer is unloaded or loaded, the trailer may be unlocked by pressing the unlock actuator 58 and if a coded unlock option is not used, the unlock operation will be effected. If, however, the coded unlock option is used, the unlock operation will not be effected unless and until a certain code is entered in a timely fashion, using the key pad 62. In the unlock operation, the hook is lowered below the ICC bar and the outside red light 27 is turned off, the outside green light 28 is turned on, the inside green light 54 is turned off and the inside red light 53 is turned off.

When a malfunction or fault condition of the system is detected, a checking operation is initiated to determine the source and to make an appropriate response. For example, if proper signals are not received from the hook actuator unit 22, a check is made to see if the harness 23 may have been cut to produce open circuit conditions. If so, an alarm signalling operation is initiated, including the sounding of a horn, flashing of lights and, optionally, the sending of an alarm signal to a remote location. If, however, open circuit conditions are not detected, a check is made to see if the hook 21, after having been moved to the upward lock condition, has been moved downwardly therefrom and if so, an anti-theft operation is initiated to automatically move the hook upwardly to the lock condition. If then, after a certain length of time, there is no success in moving hook to the lock condition, the alarm signalling operation is initiated.

In the alarm signalling operation, the horn is turned on, the inside red light 53 and the outside red light 27 are flashed on and off and a signal is sent to a remote location if that option is selected. The horn may be turned off automatically, after sounding for a certain time interval, or turning off of the horn may require the entry of certain code, using the key pad 62. After the horn is turned off, the amber light 70 may be turned on, if that option is selected, or if the amber light option is not selected, the red and green lights on both the inside and the outside are alternately turned on, to indicate that attempts to operate the system should proceed with caution.

Figure 3:
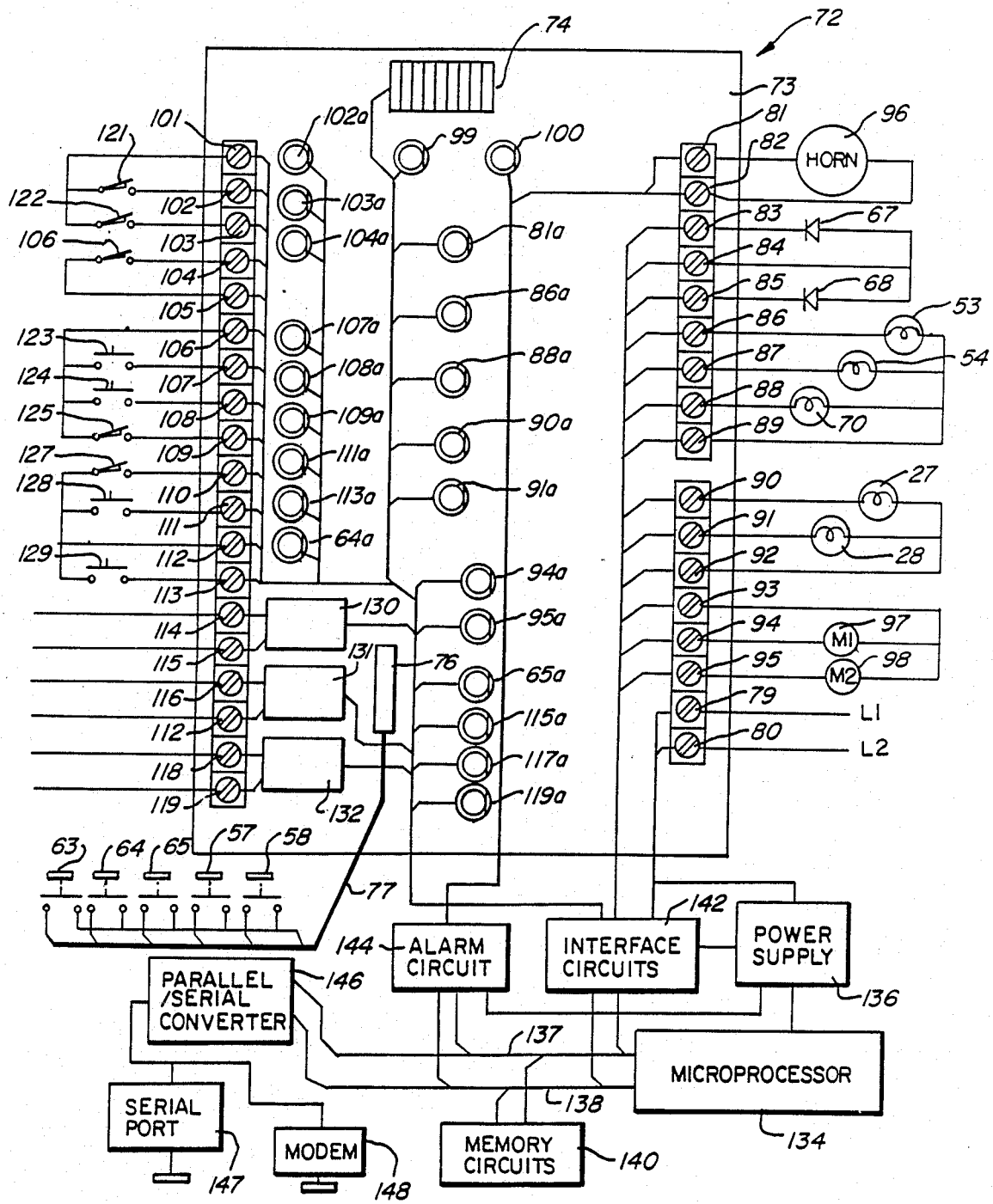
FIG. 3 is a schematic diagram showing a control unit which is on the inside of the inside control box, diagrammatically showing the connection of terminals of the control unit to components on the front panel and to components of the system.

FIG. 3 is a schematic diagram showing a control unit 72 which is on the inside of the control box and which includes a circuit board 73 with components mounted on both sides thereof, including a switch unit 74 which is of the "DIP" type and which has nine switches operable by the end of a ball point pen or the like and a jack 76 is provided which is connected through a ribbon cable 77 to contacts which are operable by the lock and unlock actuators or keys 57 and 58 and by keys 63–65 of the key pad.

The board 73 further includes a pair of line terminals 79 and 80 which are connected to AC or DC supply line and output terminals 81–95 which are connected to a horn 96, to lights 53, 54, 67, 68 and 70 of the control box 30, to the outside red and green lights 27 and 28 and to motors 97 and 98 of the hook actuator unit 22 in the manner as shown. LEDs are provided on the board 73 for use in installation and servicing, including a LED 99 which is energized when power is supplied to the line terminals 79 and 80 and a LED 100 which, when flashing, indicates proper operation of circuits on the board 73, as indicated by a self-diagnostic check thereof. LEDs 81a, 86a, 88a, 90a, 91a, 94a and 95a are energized when power is applied by the board to the respective output terminals 81, 86, 88, 90, 91, 94 and 95.

The board 73 further includes terminals 101–119 for connection to components of the locking system and to leveler or other external systems which are operatively associated with the locking system. Terminals 101–113 are input terminals and terminals 114–119 are for providing interlocks or controls of external systems. LEDs 102a, 103a, 104a, 107a, 108a, 109a, 111a and 113a are provided on the board 73 and are energized when signals are applied to the respective input terminals 102, 103, 104, 107, 108, 109, 111 and 113.

As shown diagrammatically, terminals 101–103 are connected to limit switches 121 and 122 of the hook actuator 22 and terminals 104 and 105 are connected to a "spare" limit switch 106. Terminals 106–109 are for connection to external switches which may be used in operation of the system. As shown, they may be connected to switches 123, 124 and 125. Switches 123 and 124 may be momentary contact switches operated by additional contact blocks of "raise" and "lower" pushbuttons of a hydraulic leveler.

Switch 125 may be a limit switch which is operated to and maintained in a closed position by an arm of a truck-activated type of leveler. The control unit is arranged to respond to closure of switch 125, i.e. completion of a circuit between terminals 106 and 109, to initiate a locking operation after a certain delay, e.g. after a 30 second delay. If the circuit is opened prior to the 30 second delay, the timing operation is reset.

Alternatively, switch 125 may be a switch of the photocell unit 34 and the lock operation may be initiated in direct response to backing in of a trailer to the dock and after a specific time interval which may be on the order of 30 seconds, for example. It will be understood that time intervals and other values which may be set forth herein are given by way of illustrative example and are not to be construed as limitations.

Terminals 110–113 may be connected to a limit switch 127 and pushbutton switches 128 and 129, as shown. Limit switch 127 may be operated by the overhead door 38 for allowing an unlock operation when the door is down.

Switch 128 is a "spare" and switch 129 may be a key operated switch usable in place of or in addition to the keypad switches 63-65 to silence the horn 96.

Three relays 130, 131 and 132 are mounted on the board 73 and are described herein as having contacts connected to door, leveler and security systems but the relays may be assigned other functions, according to the needs of each user of the system and the system is very versatile in this respect. Contacts of the relays 130, 131 and 132 are respectively connected to terminal pairs 114 and 115, 116 and 117 and 118 and 119. Terminals 114 and 115 are connectable to the operating system for the overhead door 38 and may be normally closed to permit operation of the door while being opened in the unhook condition to prevent operation of the door. Terminals 116 and 117 are connectable to a leveler to prevent operation until a successful lock is obtained. Terminals 118 and 119 are connectable to a security system to send an alarm signal to the system under control of the relay 132. Contacts of the relay 132 are connected between terminals 118 and 119 and are normally closed but are opened when the relay 132 is energized in response to a condition in which the hook cannot be raised to the lock position or a condition in which wires of the harness 23 are cut.

As diagrammatically illustrated, a microprocessor 134 is provided which is connected to a power supply 136 and to data and address busses 137 and 138, such busses being connected to memory circuits 140 and to interface circuits 142 which are connected to the various aforementioned components and terminals on the board 73. The interface circuits 142 include isolation circuits which transmit control signals from the input terminals while providing protection from voltage transients at the input terminals. Circuits 142 also include triacs or the equivalent which are controlled by the microprocessor to supply AC or DC current from the line terminals and/or from the power supply 136 to the outside and inside lights and to operate the hook actuator unit 22.

An alarm circuit 144 is provided which forms a special interface circuit for energizing the horn 96 and the LED 100. Alarm circuit 144 includes circuitry for energizing the horn when malfunctions are detected during the programmed operation of the microprocessor circuitry. It also includes a circuit for energizing the horn and continuously energizing the LED 100 when the microprocessor circuit is not operating properly. This circuit receives periodic reset signals from the microprocessor 134 during normal operation thereof but energizes the horn and energizes the LED 100 continuously when such reset signals are not received. A continuous horn signal and a steady light from the LED 100 thus indicate that the microprocessor circuitry is not properly functioning. The LED 100 is toggled between on and off states by such reset signals and continual flashing of the LED 100 thus indicates proper operation of the microprocessor circuitry.

A parallel/serial converter circuit 146 such as a UART (universal asynchronous receiver-transmitter) is provided for converting parallel data from the data bus 137 to serial trains of pulses for transmission out from a serial port 147, which may be a RS232 port, and for converting serial trains of pulses received by port 147 into parallel data for processing. A modem 148 is connected to the serial port 147 and is usable for transmitting and receiving data over a telephone line, if desired.

Figure 9:
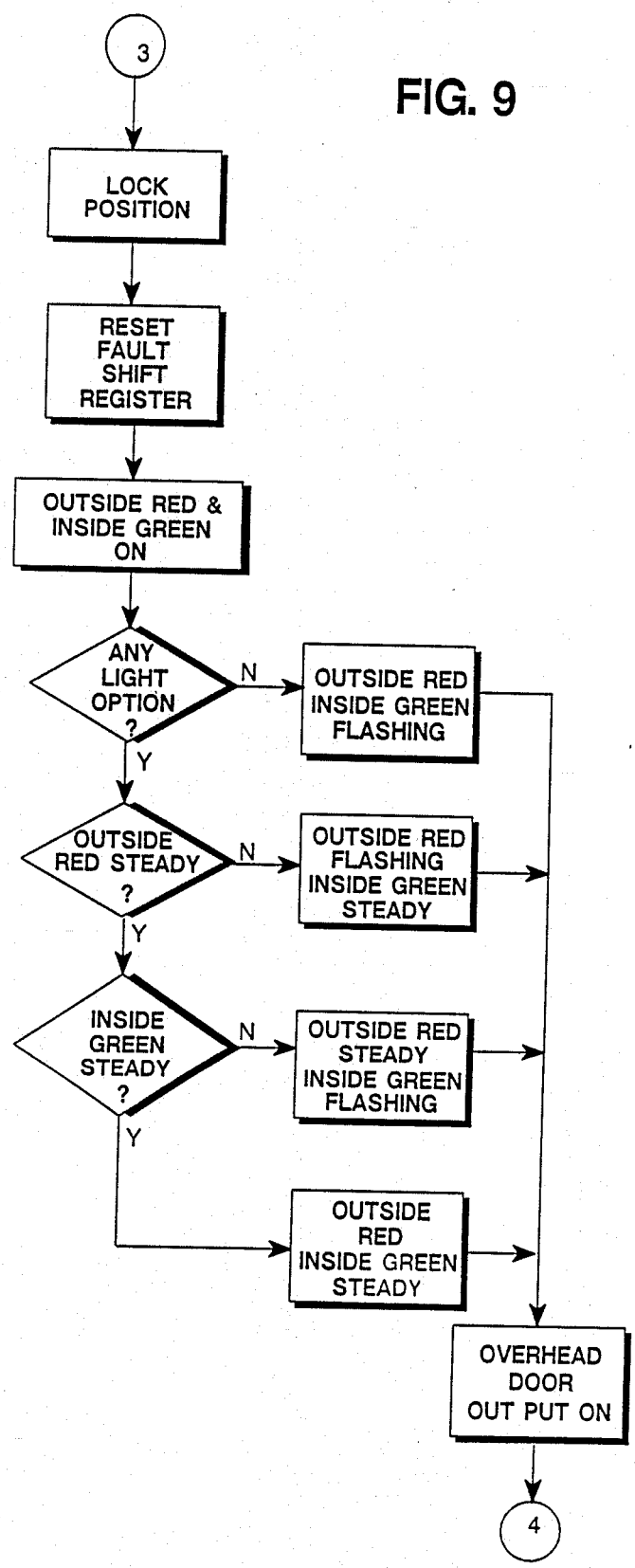
Figure 10:
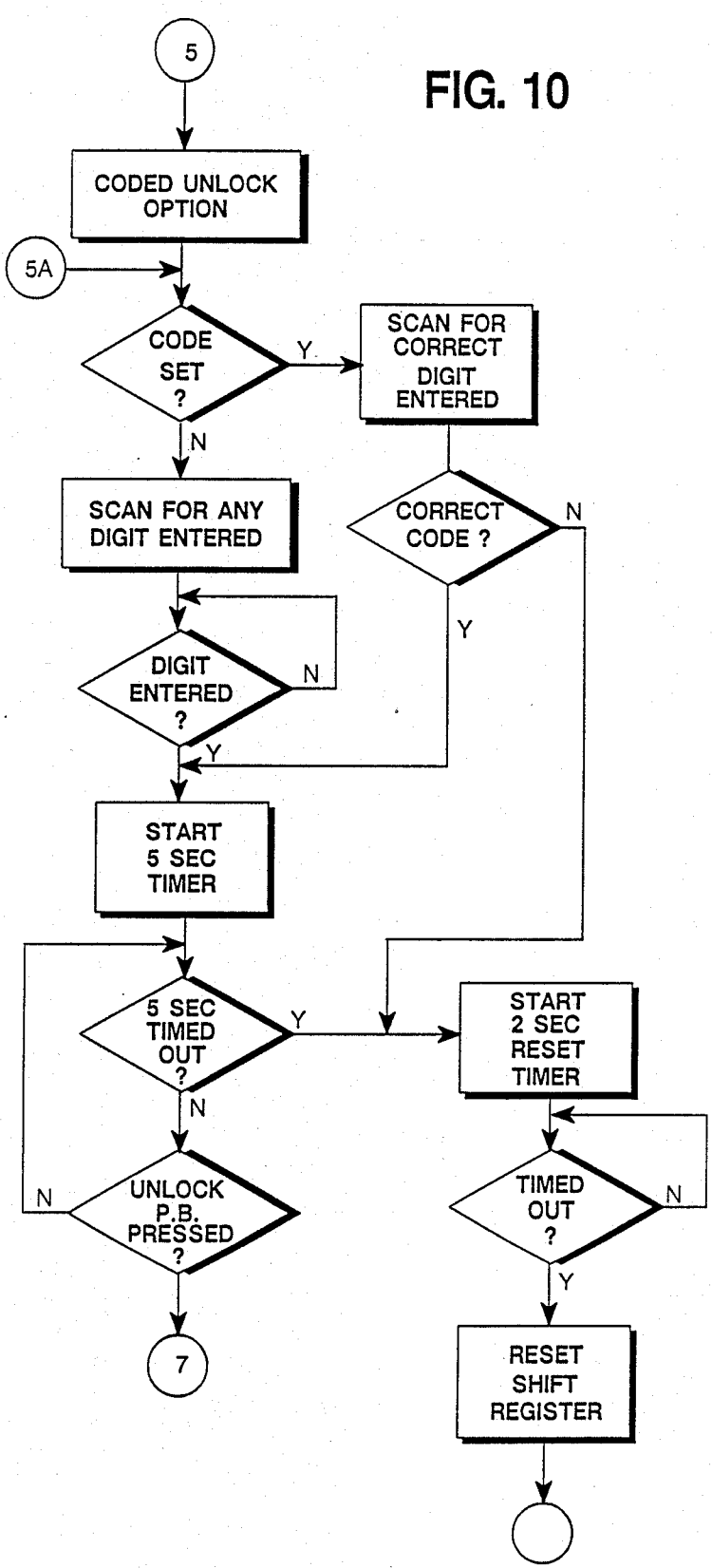
Figure 11:
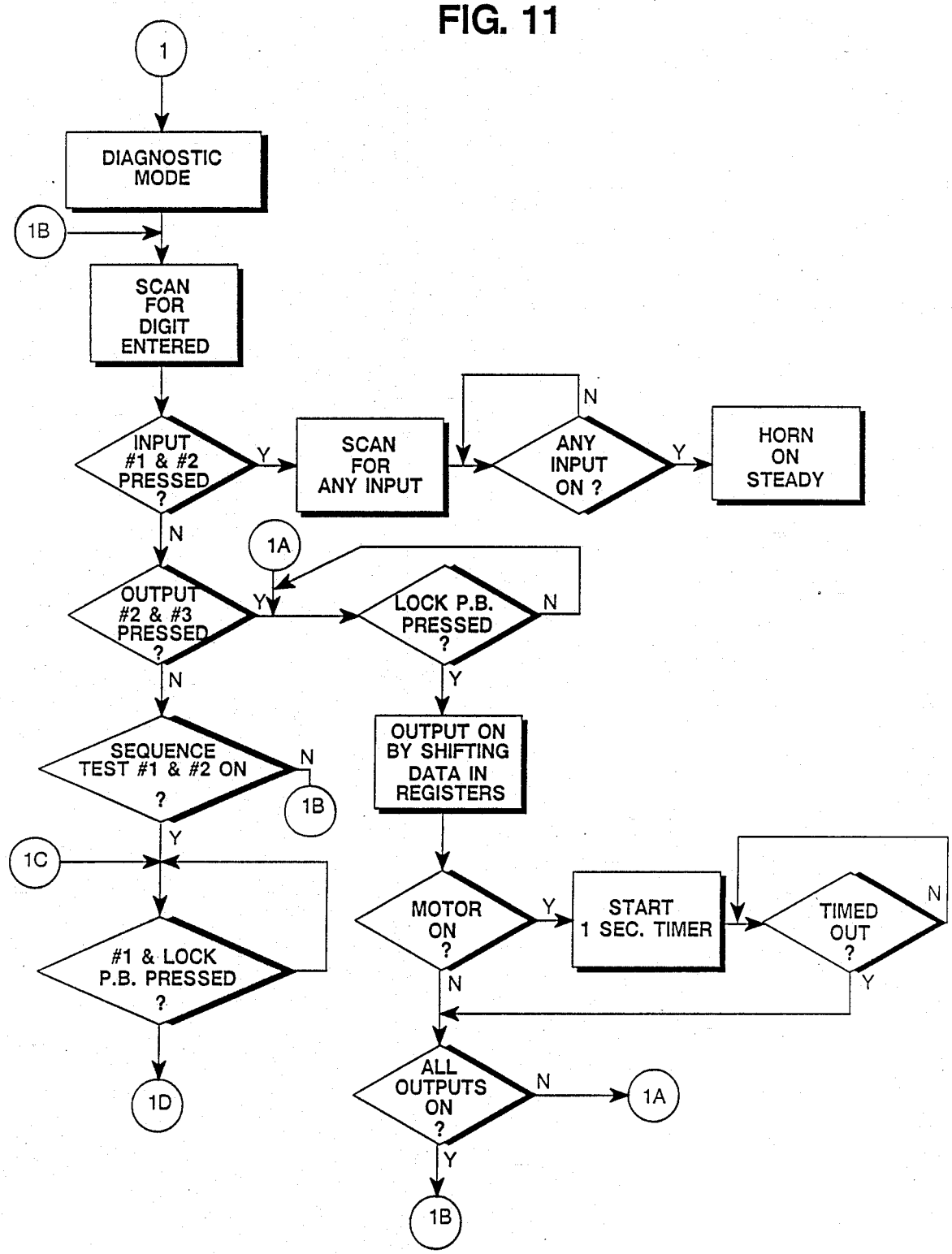

The operation of the system is depicted in the flow charts of FIGS. 4-13. At start up, a diagnostic mode check is effected, by checking the status of switches #1 through #9 of the switch unit 74. If all of switches #1 through #8 are in the off position and #9 is in the on position, the diagnostic mode is initiated as shown in FIG. 11. Otherwise, the normal operation is initiated.

Figure 6:
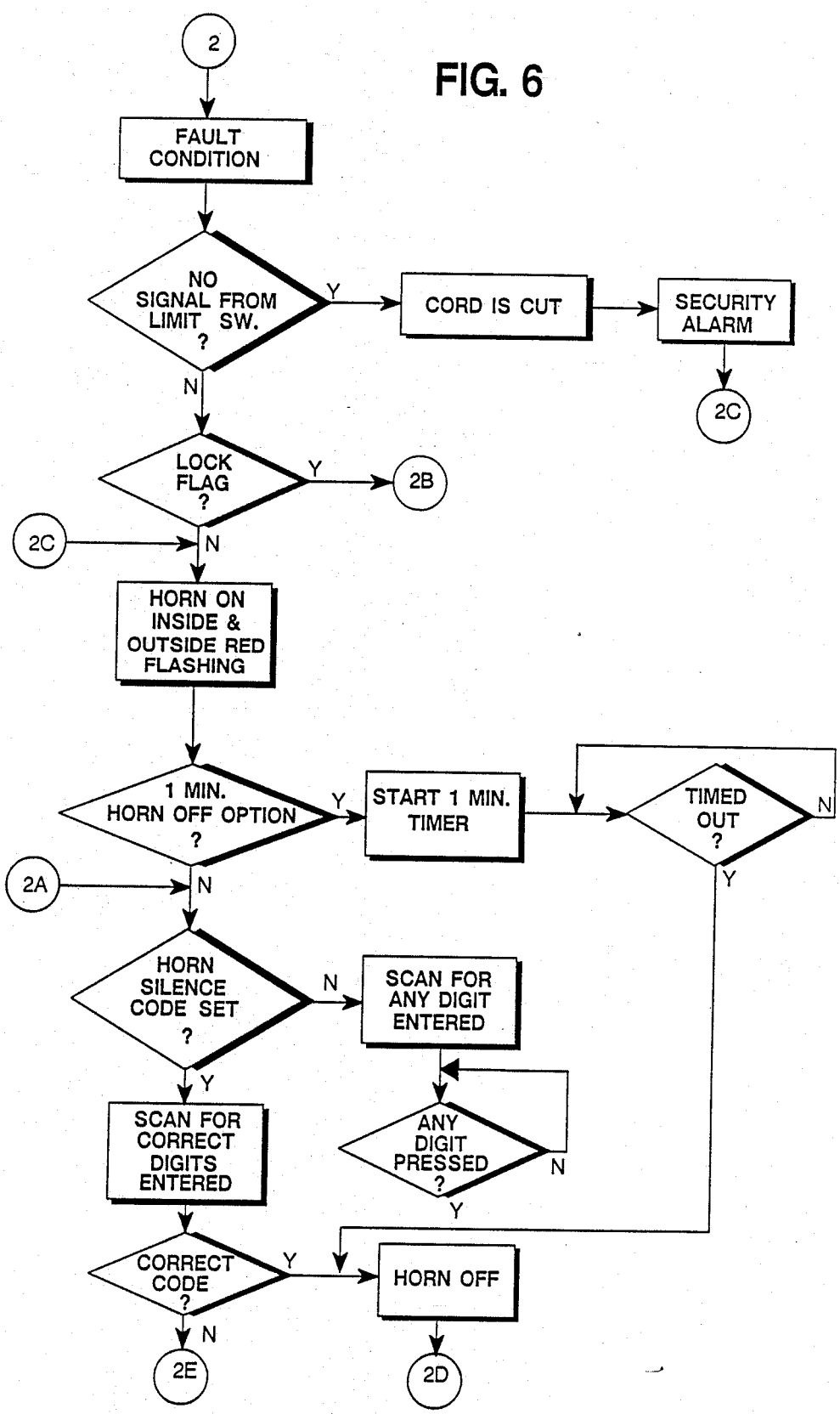
Figure 7:
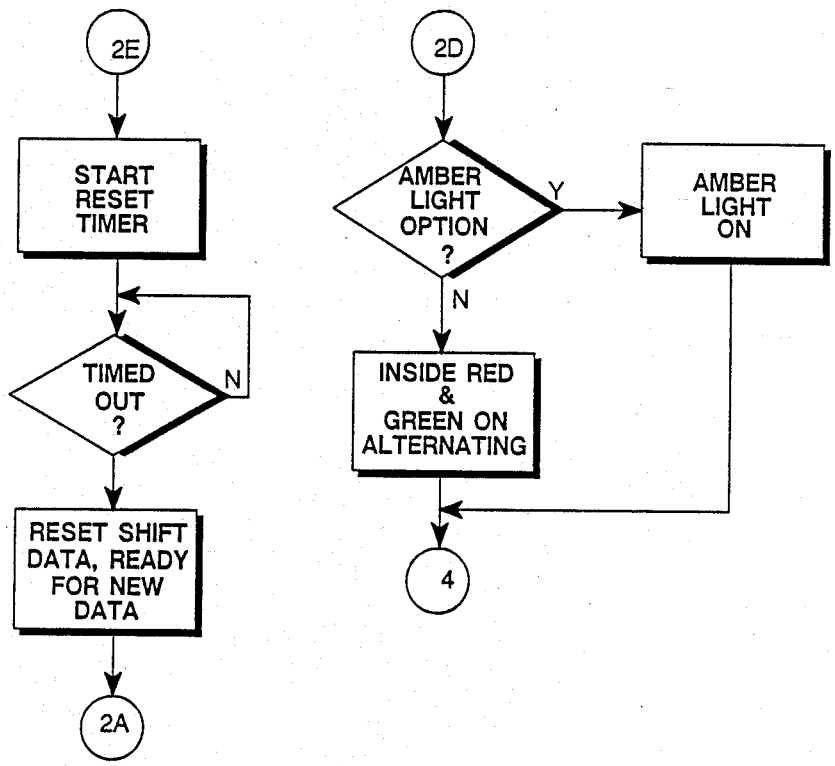

In the normal operation, a check is made of the limit switches 121 and 122 of the hook actuator 22 to determine whether the hook is either in an unlocked or stored position or a locked position. If it is not in either of such positions, it indicates a fault condition and a fault mode is initiated as shown in FIG. 6. If it is in one or the other of such positions, a check is made as to whether a stored position flag is set, i.e. whether the hook should be in the stored position. If not, a lock operation is initiated as shown in FIG. 9. If the hook should be in the stored position an unlock operation is performed to energize the inside red light 53 and outside green light 28. Four options are available. With a default option both the inside red light 53 and outside green light 28 are flashed. In the other three options, on or the other or both may be energized in a steady condition, as indicated.

The lock operation of FIG. 9 is similar to the unlock operation in that the lights are appropriately energized in accordance with selected options. It is different in that certain fault condition registers are reset and in that an overhead output is turned on to allow operation of the overhead door 38, relay 130 being energized to close a contact set connected between terminals 114 and 115.

Figure 4:
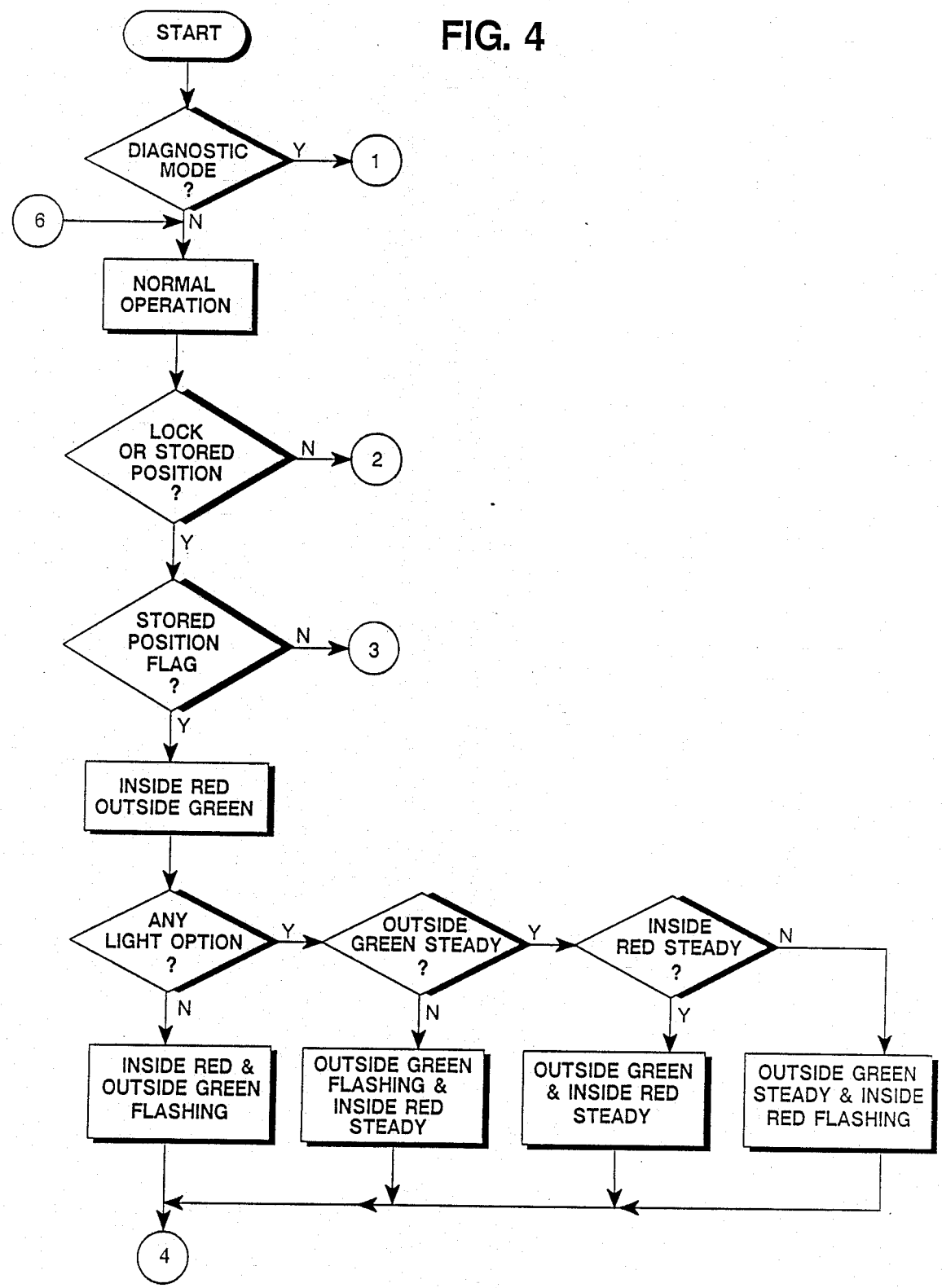
FIGS. 4–14 are flow charts which show the operation of the control unit of FIG. 3.
Figure 5:
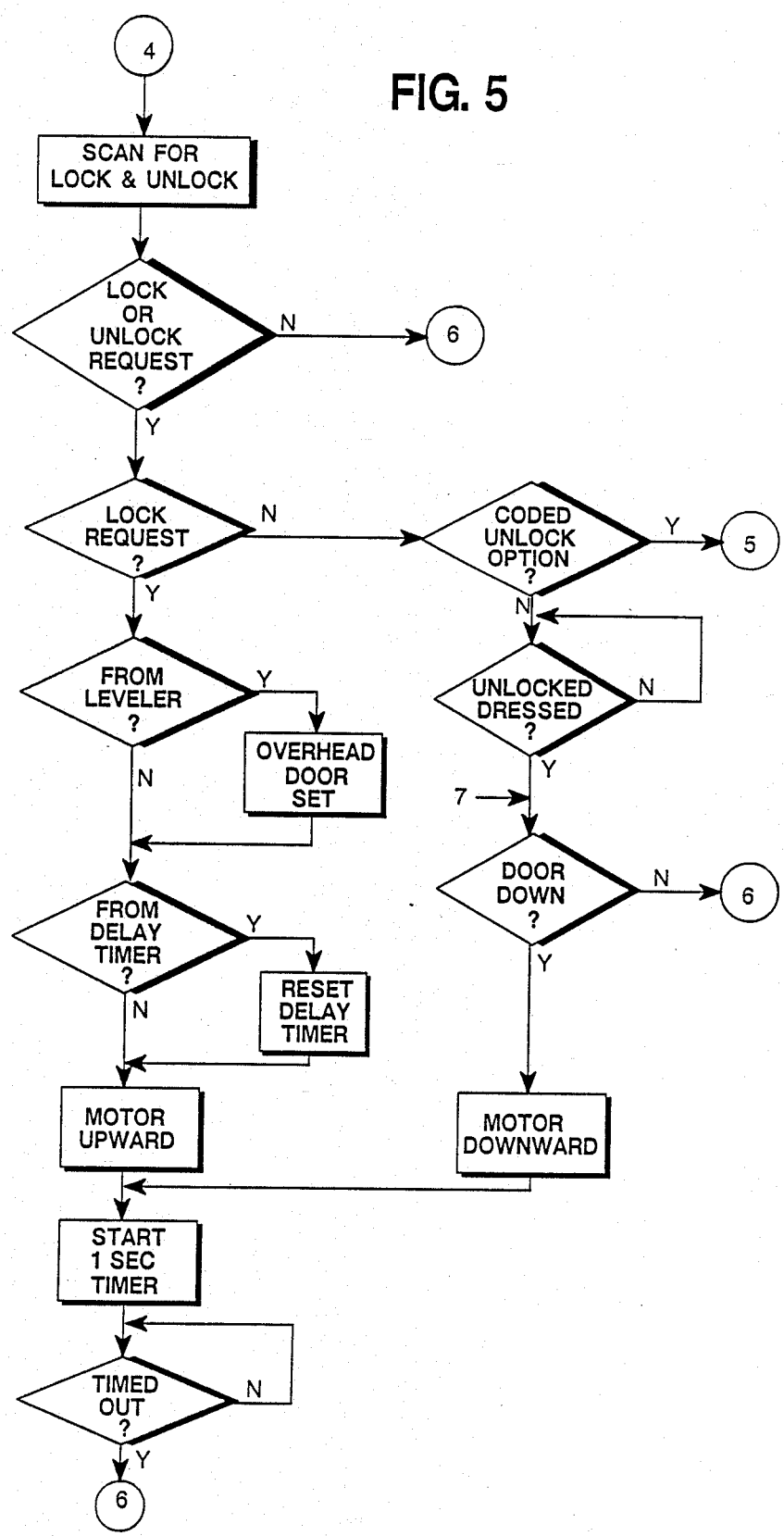

After completing either the lock operation of FIG. 9 or the unlock operation of FIG. 4, a procedure is followed as shown in FIG. 5 in which inputs 107 and 108 are scanned to see whether either the lock or unlock control panel switches 57 or 58 is closed or whether either of the external switches 123 and 124 has been closed. As aforementioned, switches 123 and 124 may be switches of a leveler such as the illustrated leveler 42. If none of such switches is closed, the normal operation procedure (FIG. 4) is again initiated. If one of the lock switches is closed, a motor of the hook actuator 22 is energized for one second in the up direction and then the normal operation procedure is again initiated. If one of the unlock switches is closed and a coded unlock operation is not selected, a motor of the hook actuator 22 is energized for one second in the down direction and then the normal operation procedure is again initiated.

The coded unlock option is shown in FIG. 10. A scanning operation is performed to determine whether a sequence of digits is entered, the sequence being determined by settings of switches #1-#8 of the switch unit 74.

Figure 8:
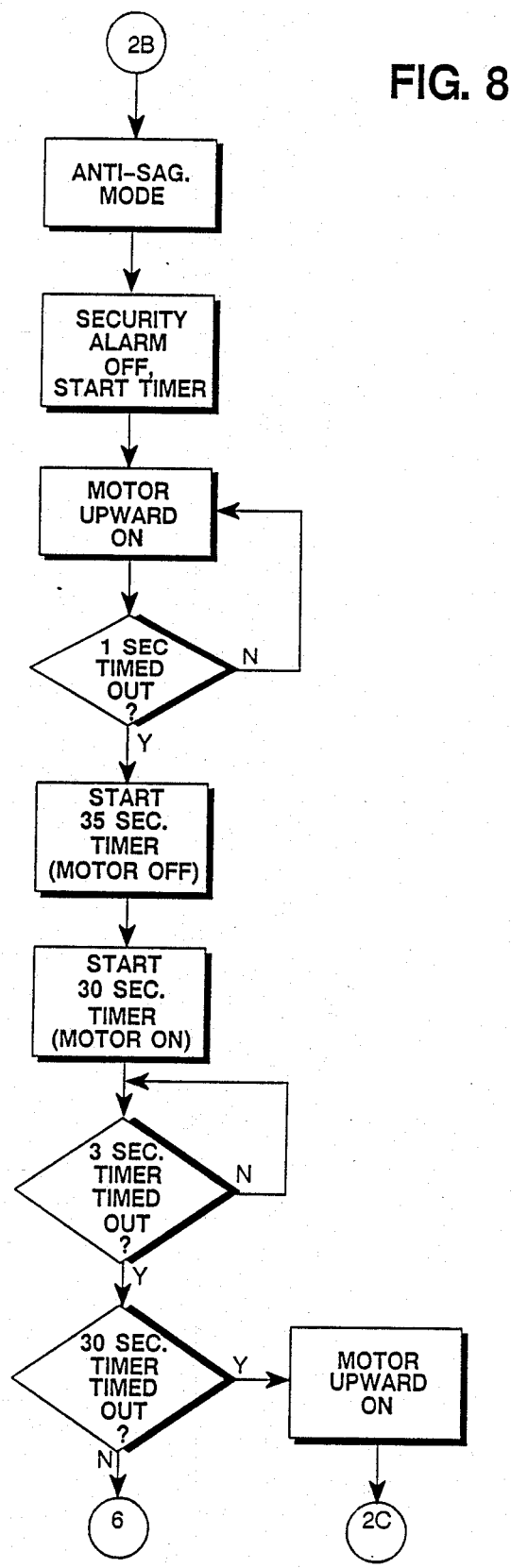

The fault condition checking operation is shown in FIG. 6 and includes a check to determine whether the cord to the limit switches of the hook actuator 22 has been cut, a security alarm signal being generated under such conditions. If the hook has been in the lock position and has been lowered, an anti-theft operation is effected as shown in FIG. 8, including the generation of the security alarm signal, and an operation to return the hook to the locked position. An alarm operation is otherwise performed as indicated in FIG. 6, continued in FIG. 7 which shows the amber light option.

Figure 12:
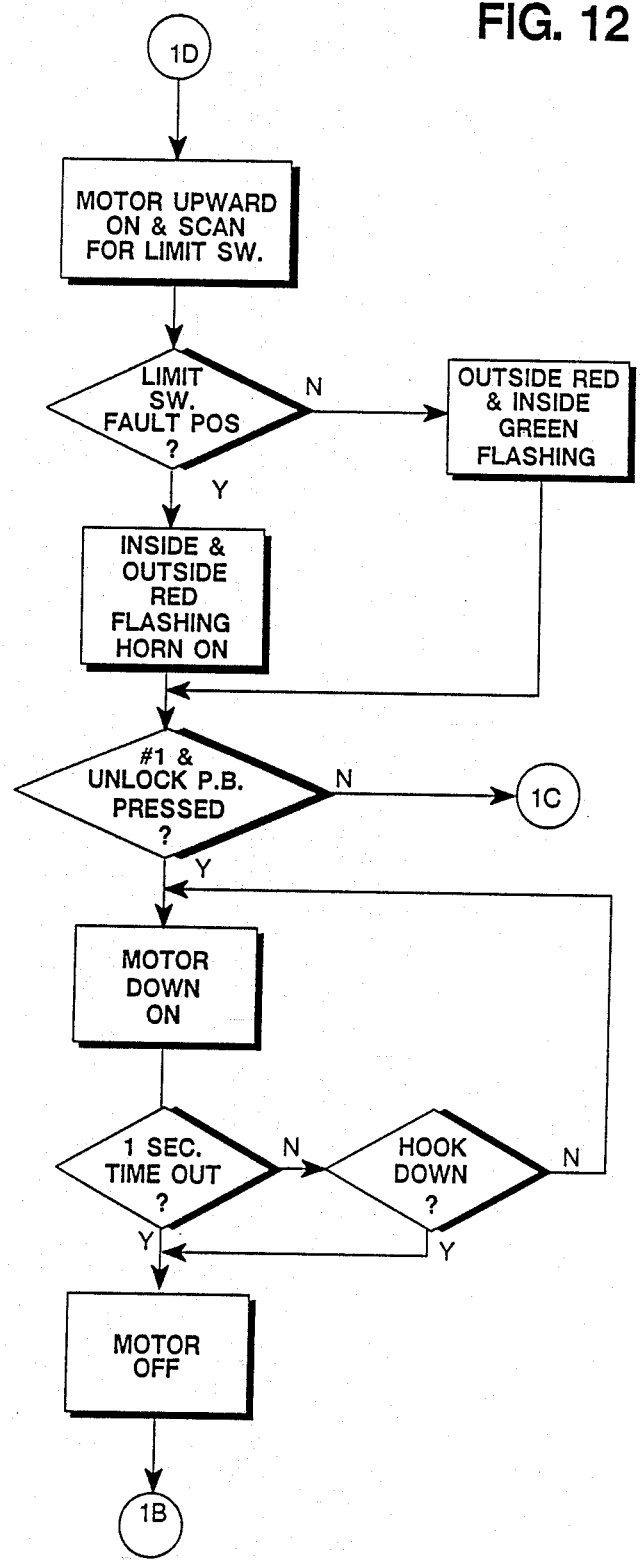

The diagnostic mode of operation is depicted in FIGS. 11 and 12 and makes use of the key pad 62 to activate tests and the various LEDs for indicating status of the components. Three areas are tested: (1) inputs, (2) outputs and (3) input and output sequence. The mode of operation will be clarified by considering the following instructions which are preferably given to the user of the system for use in setting up the system and in locating the causes of problems, should any occur:

I. INPUT DIAGNOSTIC CHECK:

1. Before starting this check make sure the following conditions exist:
   a. If equipped with a mechanical interconnect limit switch leveler must be stored.
   b. If equipped with an overhead door interlock limit switch the overhead door must be down.
   c. If equipped with a horn silence key switch the key must be in the "normal" position.
2. Use safe work habits and barricade inside and outside door which is to be tested.
3. The input test will allow you to verify which input to the controller is activated. When an input is activated the corresponding input LED will be on as well as the horn 96 will sound and LED 96a should be on.
4. Press the lock push button and let hook move to the dock face or upper fault position.
5. Enter the diagnostics mode. Set "horn silence" switches #1 thru #8 of switch 74 to the off position (down). Set the 25 diagnostic switch #9 to the on position (up). This will terminate the normal operation of the system.
6. CHECK OF INPUT 102
   a. Leaving the hook in the uppermost position open the motor cover and unplug limit switch 122 (LS2) from the control harness.
   b. Press membrane #1 and #2 panel buttons 63 and 64 simultaneously. This places the controller in the input test mode. Input 102 LED 102a and horn 96 should be on.
   c. Manually move the hook down to a position 30 degrees above horizontal (hooked position). Input 102 LED 102a and horn 96 should turn off.
   d. Manually move the hook down until the tip of the hook is 1 ½" above the top of the carriage (lower fault). Input 102 LED 102a and horn 96 should be on.
   e. NOTE: If the power is shut off, the input diagnostic mode must be reentered by pressing #1 and #2 panel buttons 63 and 64 simultaneously.
7. CHECK OF INPUT 103
   a. Leaving the hook in the lower fault position unplug limit switch 121 (LS1) from the control harness and plug in limit switch 122 (LS2). IMPORTANT: When plugging in limit switches make sure the pins of the plug are in the correct orientation with the socket before plugging it in.
   b. With limit switch 122 (LS2) plugged in input 103 LED 103a and horn 96 should be on.
   c. Manually move the hook 21 down to the stored position. Input #103a LED and horn 96 should turn off.
8. CHECK OF INPUT 107
   a. Press and hold membrane panel "lock" button. LED 107a and horn 96 should be on. Release panel button.
   b. If equipped with a Mechanical interconnect, the wire to terminal 110 must be removed from the left terminal block. BE CAREFUL not to let the wire touch any other components, place a wire nut on the end of this wire. If the wire to terminal 110 is not present proceed. With door open and wire disconnected, activate the mechanical leveler. When the lip is extended input #107 LED and horn 96 should be on. Return leveler to stored position, close door and reinstall the wire to terminal 110 if it was removed from terminal block. Do Not actuate Leveler with Door down.
   c. If equipped with a Hydraulic interconnect the wire to terminal 110 must be removed from the left terminal block. BE CAREFUL not to let the wire touch any other components, place a wire nut on the end of this wire. If the wire to terminal 110 is not present proceed. With door open and the wire to terminal 110 disconnected depress the hydraulic leveler "raise" push button. LED 107a and horn 96 should go on. Release "raise" push button, close door and reinstall the wire to terminal 110 if it was removed from the terminal block. Do not raise leveler with door down.
   d. If equipped with a remote "lock" push button, depress push button LED 107a and horn 96 should be on. Release push button.
9. CHECK OF INPUT 108
   a. If equipped with a remote "unlock" push button, depress push button. LED 108a and horn 96 should be on. Release push button.
10. CHECK OF INPUT 109
    a. If equipped with a F/A (fully automatic) leveler interconnect depress the F/A leveler interconnect limit switch. LED 109a and horn 96 should be on. Release limit switch.
    b. If equipped with a photocell interconnect hold a piece of white paper in front of the photocell switch to activate it. LED 109a and horn 96 should be on. Remove paper from photocell switch.
11. CHECK OF INPUT 110
    a. If equipped with an overhead door interlock open door to activate limit switch. LED 110a and horn 96 should be on. Lower overhead door.
12. CHECK OF INPUT 113
    a. Press #1 panel button 63. Input LED 113a and horn 96 should be on. Release panel button.
    b. If equipped with an optional horn silence key switch turn key to the "horn off" position. Input LED 113a and horn 96 should be on. Return key switch to the "normal" position.
13. CHECK OF INPUT 113
    a. Press #2 panel button 64. An input LED 64a and horn 96 should be on. Release panel button.
14. CHECK OF INPUT 23
    a Press #3 panel button 65. An input LED 65a and horn 96 should be on. Release panel button.

THIS COMPLETES INPUT DIAGNOSTIC TESTS

Upon completion of Input diagnostic tests turn power off to the controller. Reconnect limit switches 121 (LS1) and 122 (LS2) to the control harness. Turn power on to the controller. If no further diagnostic checks are to be performed return the diagnostic switch to the off position (down) and return the "horn silence code" switches to their original positions.

II. OUTPUT DIAGNOSTIC CHECK

1. Use safe work habits and barricade inside and outside door which is to be tested.
2. The output test allows you to verify which output is activated. When an output is activated the corresponding output LED will be on and the output device should be activated.
3. Enter the diagnostics mode. Set "horn silence" switches #1 thru #8 to the off position (down). Set the diagnostic switch #9 to the on position (up). This will terminate the "normal" operation of the system. The diagnostic mode will function only when the horn silence code 0000 is input.
4. Press #2 and #3 panel buttons 64 and 65 simultaneously, this places the controller in the output test mode.
5. CHECK OF OUTPUT 81
    a. Depress the panel "lock" button 57 and release. LED 81a should be on and horn should sound.
6. CHECK OF OUTPUT 86
    a. Depress the panel "lock" button 57 and release LED 86a and inside red light 53 should be on.
7. CHECK OF OUTPUT 87
    a. Depress the panel "lock" button 57 and release. LED 87a and inside green light 54 should be on.
8. CHECK OF OUTPUT 88
AMBER LIGHT OPTION (ONLY) - This will not function unless equipped with an amber light on face of control box.
    a. Depress the panel "lock" button 57 and release. LED 88a and amber light 70 should be on.
9. CHECK OF OUTPUT 90
    a. Depress the panel "lock" button 57 and release. LED40 outside red light and inside red light monitor LED should be on.
10. CHECK OF OUTPUT 91
    a. Depress the panel "look" button 57 and release. LED 91a, outside green light 28 and inside green light monitor LED 68 should be on.
11. CHECK OF OUTPUT 94
    a. Depress the panel "lock" button 57 and release. LED 94a will go on for one second and hook 21 will go up.
12. CHECK OF OUTPUT 95
    a. Depress the panel "lock" button 57 and release LED 95a will go on for one second and hook 21 will go down.
13. CHECK OF OUTPUT 116-117
HYDRAULIC INTERLOCK OPTION (ONLY) - This will not function unless equipped with optional relay.
    a. Depress the panel "lock" button 57 and release. An LED 117a should be on and hydraulic interlock relay 131 will be energized to establish continuity between terminals 116 and 117.
14. CHECK OF OUTPUT 114-115
OVERHEAD DOOR INTERLOCK OPTION (ONLY) This will not function unless equipped with optional relay.
    a. Depress the panel "lock" button 57 and release. An LED 115a should be on and the overhead door interlock relay 130 will be energized to establish continuity between terminals 114 and 115.
15. CHECK OF OUTPUT 118-119
SECURITY SYSTEM INTERFACE OPTION (ONLY) This will not function unless equipped with optional relay.
    a. Depress the panel "lock" button 57 and release. An LED 119a should be on and the security system interface relay 132 will be closed to establish continuity between terminals 118 and 119.

THIS COMPLETES OUTPUT DIAGNOSTIC CHECK

If no further diagnostic checks are to be performed, return the diagnostic switch to the off position (down) and return the "Horn Silence Code" switches to the original positions.

III. OPERATION DIAGNOSTIC CHECK

1. Use safe work habits and barricade inside and outside door which is to be tested.
2. The operation test allow you to verify the hook, light and horn relationships. The controller will step the hook 21, from the stored, to lower fault, to hooked and to upper fault positions. The light and horn relationship must be verified per hook position.
3. Important: The input and output tests must be successfully complete prior to entering this operational test mode.
4. Depress the "unlock" button 58 to place the hook 21 in the stored position.
5. Enter the diagnostics mode. Set "horn silence" switches #1 thru #8 to the off position (down). Set the diagnostic switch #9 to the on position (up). This will terminate the "normal" operation of the system.
6. ENTERING DIAGNOSTIC CHECK
    a. Press #1 and #3 membrane panel buttons 63 and 65 simultaneously. This places the controller in the operational test mode.
    b. At this time the hook 21 is in stored position outside green light, green light monitor LED and inside red light should be flashing and horn 96 should be off.
7. CHECK OF LOWER FAULT
    a. Press #1 panel button 63 and "lock" simultaneously, the hook 21 will rotate to a lower fault position and stop.
    b. Outside red light, red light monitor LED and inside red light should be flashing, and horn 96 should be pulsing on and off.
8. CHECK OF HOOKED POSITION
    a. Press #1 panel button 63 and "lock" button 57 simultaneously, the hook 21 will rotate to a hooked position and stop.
    b. Outside red light, red light monitor LED and inside green light should be flashing, and horn 96 should be off.
9. CHECK OF UPPER FAULT
    a. Press #1 panel button 63 and "lock" button 57 simultaneously, the hook 21 will rotate to an upper fault position and stop.
    b. Outside red light, red light monitor LED and inside red light should be flashing, and horn 96 should be pulsing on and off.
10. To return to stored position, press #1 panel button 63 and "unlock" button 58 simultaneously. The hook 21 will rotate to the stored position.

THIS COMPLETES THE OPERATION DIAGNOSTIC CHECK.

If no further diagnostic checks are to be performed return the diagnostic switch to the off position (down) and return the "Horn Silence Code" switches to their original positions.

Figure 13:
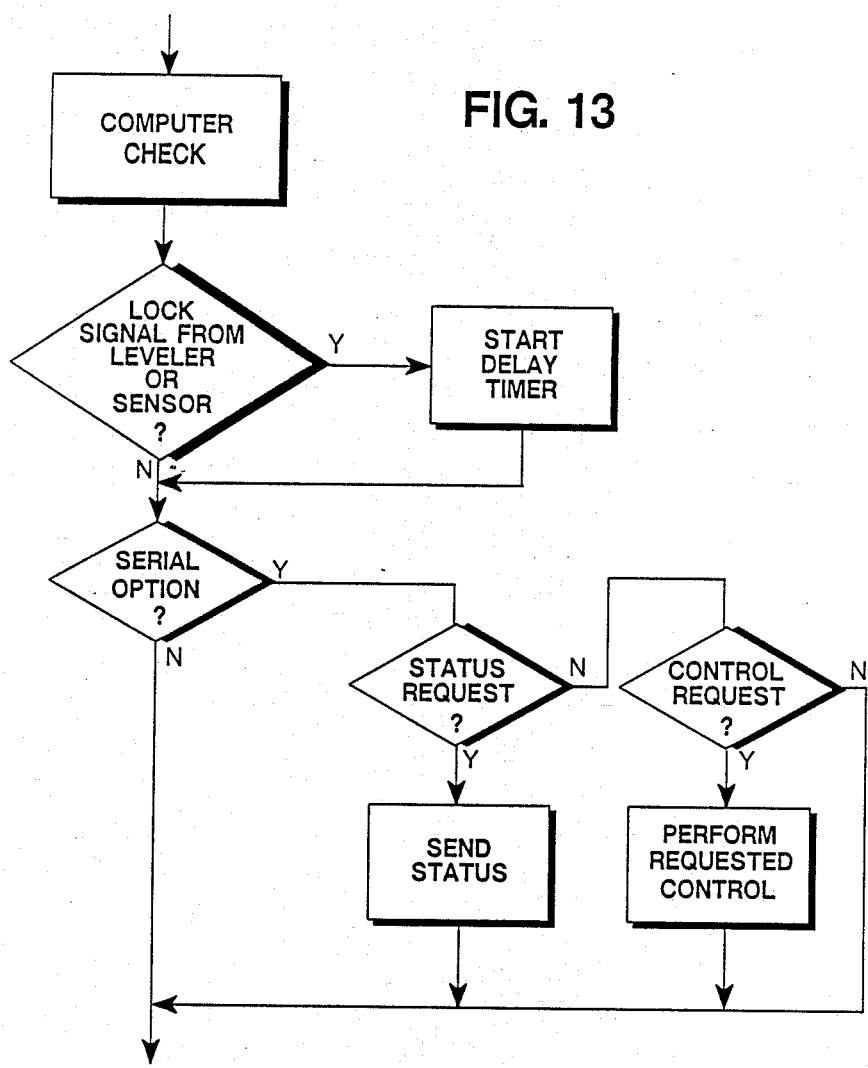

FIG. 13 depicts an operation which is performed as part of the "Normal Operation" block in FIG. 4. First a computer check operation is performed, shown in FIG. 14. Then a check is made as to whether leveler switch is closed of a type such that a lock operation should be performed after elapse of a certain time interval such as a 30 second interval, for example. If so a delay timer is started to time out after elapse of the time interval, the time-out being detected in the scan for lock and unlock operation which is depicted in FIG. 5. As shown, if a remote communication option is selected, a check is made as to whether either a status request or a control request has been received through the serial port, the requested action being then effected.

Figure 14:
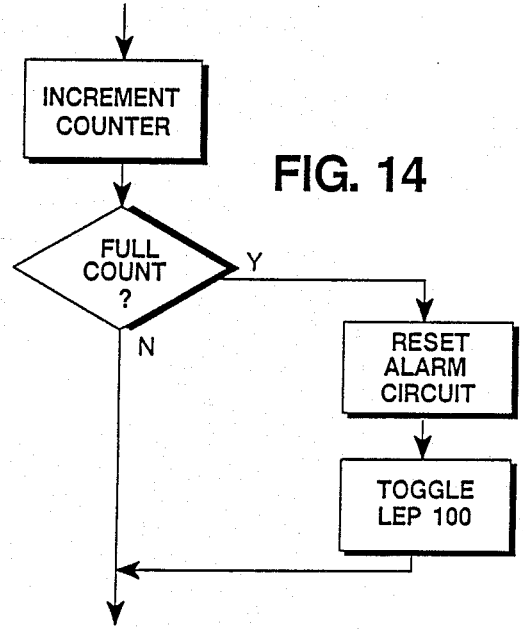

In the computer check operation of FIG. 14, a counter is incremented and then a test is made as to whether a certain full count has been reached. If so, the counter is reset, and signals are applied to the alarm circuit 144 to toggle the LED 100 from on to off or from off to on and to prevent generation of an alarm. The computer check operation is also included in timing and other loops and scanning operations such as shown in FIGS. 5, 6, 8 and 10-12, to provide for continual checking of the operation of the microprocessor. If the microprocessor circuits should fail to operate, the reset signal will not be applied to the alarm circuit, the horn 96 will be energized and the LED 100 will be on steadily rather than flickering.

It will be understood that modifications and variations may be effected without departing from the spirit and scope of the novel concepts of this invention.

We claim:

1. A loading dock signalling and control system for a dock facility which includes a loading dock, an electrically controllable locking device operative to receive and retain a parked vehicle and condition sensing means associated with said locking device, said system comprising: green and red outside light means for positioning on the outside of the facility, green and red inside light means, inside manually operable lock and unlock switch means accessible to dock personnel, a control unit having input and output terminals, said terminals including first input terminals coupled to said condition sensing means, second input terminals coupled to said switch means, first output terminals coupled to said locking device and second output terminals coupled to said inside and outside signal light means, said control unit being programmed to periodically check the conditions of said input terminals and to effect programmed operations which include control of said first output terminals in accordance with the status of said first and second input terminals for operating said device in accordance with the condition thereof and in accordance with signals from said lock and unlock switch means and which include control of said second output terminals in accordance with the status of said first input terminals to operate said inside and outside light means as a function of the condition of said locking device, said locking device being arranged for cooperable operation with associated equipment at said facility, said terminals further including third input terminals for connection to associated equipment, and said programmed operations further including control of first output terminals as a function of status of said third input terminals.

2. A loading dock signalling and control system as defined in claim 1, wherein said associated equipment includes an overhead door, said third input terminals including terminals for sensing the condition of said door, and said programmed operations including control of said first output terminals as a function of the status of said third input terminals to prevent operation of said device to an unlocked condition when said door is open.

3. A loading dock signalling and control system as defined in claim 1, wherein said associated equipment includes an overhead door, and wherein said terminals of said control unit further include third output terminals, said third output terminals including terminals for connection to an operating mechanism for said door, and said programmed operations including control of said third output terminals as a function of the status of said first input terminals to prevent raising of said door when said locking device is in an unlocked condition.

4. A loading dock signalling and control system as defined in claim 1, wherein said associated equipment includes a leveler, said third input terminals including terminals for connection to said leveler, and said programmed operations including control of said first output terminals to operate said locking device to a locked condition in response to operation of said leveler.

5. A loading dock signalling and control system as defined in claim 1, wherein said associated equipment includes both an overhead door and a leveler, and wherein said terminals of said control unit further include third output terminals, said third input terminals including terminals for sensing the condition of said door, and said third output terminals including terminals for connection to an operating mechanism for said leveler, said programmed operations including control of said third output terminals to prevent operation of said leveler until said door is raised.

6. A loading dock signaling and control system as defined in claim 1, said third input terminals including terminals for receiving a lock signal from said associated equipment, and said programmed operations including control of said first output terminals to operate said locking device to a locked condition in response to a lock signal from said associated equipment.

7. A loading dock signalling and control system as defined in claim 6, said programmed operations further including a timing operation to interpose a certain time delay between a lock signal from said associated equipment and operation of said locking device to a locked condition.

8. A loading dock signalling and control system as defined in claim 7, said associated equipment including sensing means for sensing the parking of a vehicle at said dock.

9. A loading dock signalling and control system as defined in claim 1, said third input terminals including terminals for receiving an unlock signal from said associated equipment, and said programmed operations including control of said first output terminals to operate said locking device to an unlocked condition in response to an unlock signal from said associated equipment.

10. A loading dock signalling and control system for a dock facility which includes a loading dock, an electrically controllable locking device operative to receive and retain a parked vehicle and condition sensing means associated with said locking device, said system comprising: green and red outside light means for positioning on the outside of the facility, green and red inside light means, inside manually operable lock and unlock switch means accessible to dock personnel, a control unit having input and output terminals, connection wire means on the outside of said facility for connecting said control unit and said locking device, said terminals including first input terminals coupled through said connection wire means to said condition sensing means, second input terminals coupled to said switch means, first output terminals coupled to said locking device and second output terminals coupled to said inside and outside signal light means, said control unit being programmed to periodically check the conditions of said input terminals and to effect programmed operations which include control of said first output terminals in accordance with the status of said first and second input terminals for operating said device in accordance with the condition thereof and in accordance with the signals from said lock and unlock switch means and which include control of said second output terminals in accordance with the status of said first input terminals to operate said inside and outside light means as a function of the condition of said locking device, said programmed operations including a check for an open circuit condition of said connection wire means between said control unit and said locking device and said programmed operations further including the sending of security alarm signals to a remote location in response to said open circuit condition of said connection wire means between said control unit and said locking device.

11. A loading dock signalling and control system as defined in claim 10, said control unit including a microprocessor and a parallel/serial interface coupled to said microprocessor for sending serial security alarm signals to a remote location.

12. A loading dock signalling and control system as defined in claim 11, said parallel/serial interface being also arranged to receive control signals from a remote location for control of said control unit.

13. A loading dock signalling and control system as defined in claim 10, further including modem means for sending of said security alarm signals.

14. A loading dock signalling and control system for a dock facility which includes a loading dock, an electrically controllable locking device operative to receive and retain a parked vehicle and condition sensing means associated with said locking device, said system comprising: green and red outside light means for positioning on the outside of the facility, green and red inside light means, inside manually operable lock and unlock switch means accessible to dock personel, a control unit having input and output terminals, said terminals including first input terminals coupled to said condition sensing means, second input terminals coupled to said switch means, first output terminals coupled to said locking device and second output terminals coupled to said inside and outside signal light means, said control unit being programmed to periodically check the conditions of said input terminals and to effect programmed operations which include control of said first output terminals in accordance with the status of said first and second input terminals for operating said device in accordance with the condition thereof and in accordance with signals from said lock and unlock switch means and which include control of said second output terminals in accordance with the status of said first input terminals to operate said inside and outside light means as a function of the condition of said locking device, and diagnostic means associated with said control unit for signalling proper and improper functioning thereof, said diagnostic means including self-ckeck operations which are repeatedly and continually performed as part of said programmed operations to develop periodic signals during said programmed operations, and alarm means for developing an alarm signal when said periodic signals are not developed to thereby indicate that said programmed operations are not being performed.

15. A loading dock signalling and control system as defined in claim 14, said diagnostic means further including a light which is periodically turned on and off in response to said periodic signals.

16. A loading dock signalling and control system as defined in claim 14, horn means for signalling improper operation of said system, said programmed operations including means for silencing said horn means after elapse of a certain time interval.

17. A loading dock signalling and control system as defined in claim 14, said control unit including inside amber light means and output terminals connected thereto, said programmed operations being arranged to disable said system under predetermined conditions and being arranged to then allow continued operation in response to manual override while controlling said output terminals to energize said amber light means.

18. A loading dock signalling and control system for a dock facility which includes a loading dock, an electrically controllable locking device operative to receive and retain a parked vehicle and condition sensing means associated with said locking device, said system comprising: green and red outside light means for positioning on the outside of the facility, green and red inside light means, inside manually operable lock and unlock switch means accessible to dock personnel, a control unit having input and output terminals, said terminals including first input terminals coupled to said condition sensing means, second input terminals coupled to said switch means, first output terminals coupled to said locking device and second output terminals coupled to said inside and outside signal light means, said control unit being programmed to periodically check the conditions of said input terminals and to effect programmed operations which include control of said first output terminals in accordance with the status of said first and second input terminals for operating said device in accordance with the condition thereof and in accordance with signals from said lock and unlock switch means and which include control of said second output terminals in accordance with the status of said first input terminals to operate said inside and outside light means as a function of the condition of said locking device, and diagnostic means associated with said control unit for signalling proper and improper functioning thereof, said diagnostic means including diagnostic switch means for selecting a diagnostic mode of operation, and said programmed operations including diagnostic control operations which are performed in response to operation of said diagnostic switch means, said diagnostic control operations being arranged to develop a predetermined indication in response to each of a series of physical tests performed on components of said system by an operator thereof.

19. A loading dock signalling and control system as defined in claim 18, said diagnostic control operations being performed in part in response to operation of said manually operable switch means accessible to dock personnel.

20. A loading dock signalling and control system as defined in claim 18, said diagnostic control operations including an input diagnostic test operation in which the status of said input terminals is compared with the proper status thereof during physical tests performed on components connected to said input terminals.

21. A loading dock signalling and control system as defined in claim 18, said diagnostic control operations including an output diagnostic test operation in which the status of said output terminals is compared with the proper status thereof during certain of said physical tests.

22. A loading dock signalling and control system as defined in claim 18, said diagnostic control operations including an input and output sequence diagnostic test operation in which the operability of portions of the system is determined during certain of said physical tests.

23. A loading dock signalling and control system as defined in claim 18, said control unit including code switch means operable by dock personnel and connected to fourth input terminals, said diagnostic control operations being controllable in part as a function of the status of said fourth input terminals to perform a variety of diagnostic operations under control of said code switch means.

24. A loading dock signalling and control system as defined in claim 23, said programmed operations further including normal operations performed in accordance with the status of said fourth terminals to permit certain operations only in response to entry of a certain code through said code switch means.

25. A loading dock signalling and control system as defined in claim 24, horn means for signalling improper operation of said system, said programmed operations including means for silencing said horn means as a function of the status of said fourth terminals to permit silencing of said horn means through entry of a certain code.

26. A loading dock signalling and control system as defined in claim 18, said control unit including signal lights for indicating the status of each input and output terminals for indicating the results of said diagnostic control operations.

* * * * *